3,516,465
REINFORCED TIRE
Raymond F. J. Guyot, Paris, France, assignor to Fiverel Company, Paris, France, a corporation of France
Filed Jan. 18, 1968, Ser. No. 698,800
Claims priority, application France, Jan. 18, 1967, 91,579
Int. Cl. B60c 9/20, 9/18
U.S. Cl. 152—361　　　　　　　　　　　　　　5 Claims

ABSTRACT OF THE DISCLOSURE

A reinforced tire having in the zone of the tread a belt comprising one or more sheets of cabled cords or twisted single yarns or threads of glass filaments which can be individually coated in a sheath of elastomer, and one or more layers of high-hardness elastomer having a Shore hardness of greater than 70. The high-hardness elastomer can be located either below the belt or below and between the multiple elements thereof.

---

The present invention relates to a reinforced tire and, more particularly, to a reinforced radial tire having beneath the tread a belt comprising one or more sheets of cabled cords or twisted single yarns or threads of continuous glass filaments and one or more layers of a high-hardness elastomer or rubber.

Prior to the development of the present invention, it has been known to reinforce tires in the tread zone by the use of artificial, synthetic, or metallic textiles. Moreover, reinforcing belts of glass cord have also been utilized in the reinforcement of tires.

Thus, for example, many attempts have been made for effective introduction of glass textiles into the armatures of tires, but practical results have thus far been disappointing. Generally, the failure of such glass textiles in the reinforcing of tires has been attributed to abrasion of the elementary yarns against each other, whereupon displacements are produced by friction with each other in the tire envelope in the course of use.

While various attempts have been made to offset this problem, such attempts have for the most part been unsuccessful. Thus, for example, it has been previously proposed to individually coat the glass yarn with a layer of elastomer which adheres to the glass, preventing contact between the elementary filaments. While this eliminates the problem to some extent, still the problem is not eliminated to an extent of production of a commercially feasible embodiment.

Accordingly, there has been a long desire for the production of a reinforced tire which successfully utilizes cords of glass filaments and eliminates the problems associated with the prior art.

This has now been accomplished in accordance with the present invention which contemplates a tire reinforced with a belt comprising one or more sheets of cabled cords or twisted single yarns or threads of continuous glass filaments beneath the tread and one or more layers of a high-hardness elastomer or rubber having a Shore hardness of greater than 70.

Accordingly, it is a principal object of the present invention to provide a reinforced tire which eliminates the inherent deficiencies of previous tires.

It is a further object of the present invention to provide a tire reinforced with a belt comprising one or more sheets of cabled cords or twisted single yarns or threads of continuous glass filaments and by one or more layers of a high-hardness elastomer.

A still further object of the present invention is to provide such a reinforced tire wherein a high-hardness elastomer layer having a Shore hardness of greater than 70 is located either below or below and between the elements of continuous glass filaments.

Still further objects and advantages of the reinforced tire of the present invention will become more apparent from the following more detailed description and the accompanying drawings wherein.

In the figures, like numerals represent like elements.

Figure 1:
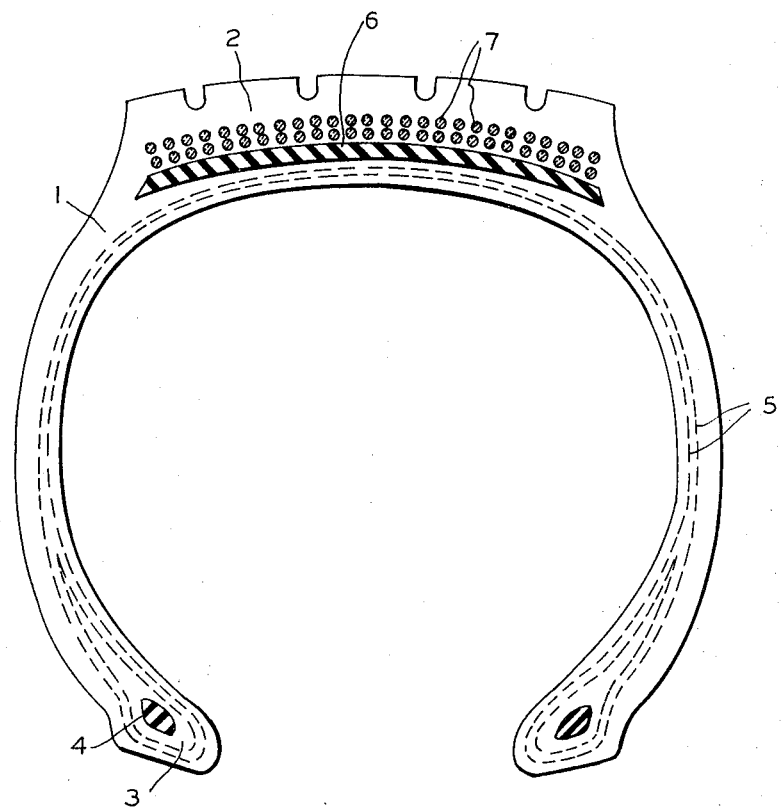
FIG. 1 is a cross-sectional view of a radial tire illustrating one embodiment of the present invention.

In FIG. 1 a radial type tire 1 is shown with a tread portion 2 with a bead 3 and wire 4 within a casing 5. These portions of the tire can be prepared from any conventional material generally utilized in the production of radial tires. Thus, the carcass of casing may be fabricated utilizing cotton, rayon, nylon, polyester, glass, or even fine high-tensile wire. Similarly, the rubber employed in the carcass or casing 5 can be any conventionally employed rubber, this also being true for the rubber being employed in the tread 2 of the radial tire 1.

As illustrated in FIG. 1, however, the present invention comprises an improvement in such a conventional radial tire by providing a belt 6 comprising one or more sheets of cabled cords or twisted single yarns or continuous filament threads of glass filaments individually sheathed in an elastomer and a layer 7 of elastomer of a Shore hardness of greater than 70.

The belt 6 of glass fibers comprises one or more sheets of cabled cords or twisted single yarns or threads of continuous glass filaments located below the tread of a conventional radial tire. Since a strand of glass filaments generally comprises a collection of a great plurality of individual filaments, a cord may be composed of a large number of individual filaments ranging sometimes in number from 200 to 30,000.

Preferably, the individual glass filaments are sheathed in an elastomer so as to prevent direct contact of the individual filaments in the belt beneath the tread in the radial tire of the present invention. For this purpose, any conventional elastomer can be utilized. Thus, for example, the individual glass filaments can be sheathed in a suitable composition comprising a resorcinol/formaldehyde resin and a synthetic rubber latex, e.g. butadiene/styrene. Similarly, a suitable composition which can be used to impregnate and sheathe the individual glass filaments can comprise a resorcinol/formaldehyde resin and a vinyl pyridine latex. Of course, such compositions are only illustrative since any elastomeric material capable of preventing direct contact of the glass filaments with each other can be suitably employed in the production of the novel article of the present invention.

In the tire of the present invention, the glass filaments are held tightly together in the cabled glass yarns or the like in an assembly in which they all work together. This is achieved by using high twists, the individual filaments being held more firmly in relation to one another in proportion as the degree of twist is higher.

To obtain the desired level of twist, reference can readily be made to the coefficient of twist (Koechlin's law) which relates twist per meter of thread to its cross section or, more conveniently, to its metric count. As is well known, the coefficient of twist C is related to the twist T expressed in turns per meter, and to metric count Nm by the formula:

$$C = \frac{T}{\sqrt{Nm}}$$

Application of this formula to cabled cellulose rayon cords currently used for reinforcement of pneumatic tires such as the 1650/2 denier yarn having Z twists of 472 turns per meter and S twists of 472 turns per meter and a final metric count of about 2.3 shows that the primary and secondary twist coefficients involved are respectively of the order of 210 and 290. However, to relate the results given by glass yarns to those presented by cellulose textiles, and to make a comparison on identical cross sections, it is necessary to take into account the differences of density of the materials (2.5 for glass, and 1.52 for cellulose) which lends to a corrected twist coefficient $C_1$ expressed by the formula:

$$C_1 = \frac{T}{\sqrt{\frac{2.5}{1.52 Nm}}} = \frac{T}{1.28\sqrt{Nm}}$$

In accordance with the invention, it has been found that the combination of high twists with the use of hard elastomers is not fully effective unless the corrected coefficient of twist exceeds 80 and also the Shore hardness of the elastomer is at least 70. With appropriate cabling equipment corrected coefficients of twist in the zone of the coefficients of twist of cabled rayon yarns can readily be obtained.

The minimum corrected coefficient of twist applies to the twisting of the group of filaments whatever it may be. In the case of cabled yarns having two twisting stages, the corrected minimum coefficient applies at both stages, i.e. to the singles yarn and to the cabled yarn.

Figure 2:
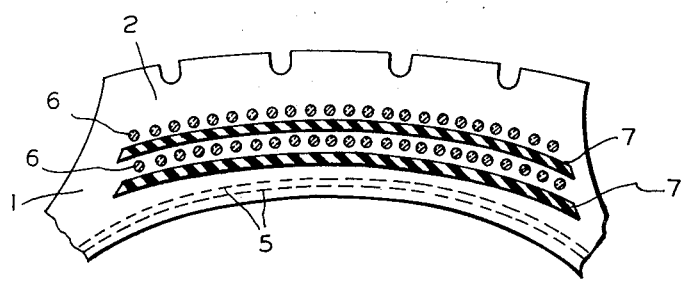
FIG. 2 is a further cross-sectional view of a radial tire illustrating a further embodiment of the present invention.

In accordance with the present invention, it has been found that a distinct improvement of the service life of the tire is obtained if a layer 7 comprising an elastomer having a Shore hardness equal or greater than 70 is located below the twisted glass yarn cord or similar material constituting the belt 6, as shown in FIG. 1. The layer 7 of hard elastomer or rubber generally comprises a layer of from 1 to 6 millimeters in thickness, located below the cord 6 as illustrated in FIG. 1. Alternatively, however, one or more layers comprising a total thickness of 1 to 6 millimeters can be located as shown in FIG. 2 both below and between the cords which make up the belt 6 of the radial tire 1. In this respect, it has been found that by locating the layer 7 above or partly above the belt 6, the improvement in the service life of the tire associated with the radial tire of the present invention is not achieved.

This embodiment wherein the layer 7 is located below and between the belt 6 is illustrated in FIG. 2. When employing a plurality of layers, such as illustrated in FIG. 2, the total thickness of the layers should still be within 6 millimeters.

The layer of elastomer 7 can comprise any conventional elastomer or rubber having the requisite Shore hardness of 70 or greater. Thus, for example, the layer 7 can comprise a natural or synthetic rubber compounded with sufficient black, e.g. carbon black, furnace black, or channel black, to produce the requisite hardness in the elastomeric material. In this respect, it is generally necessary to compound natural rubber and similar synthetic rubers with from 50 to 75 parts of black per 100 parts of elastomer to provide the necessary hardness. Again, exemplary materials include natural rubber, polybutadiene, polyisoprene, copolymers of butadiene and styrene, copolymers and butadiene and acrylonitrile, terpolymers of butadiene, styrene, and acrylonitrile, butyl rubbers, etc. In addition to the employment of various blacks to increase the hardness of the elastomer to the minimum level to be employed in accordance with present invention, other conventional fillers can also be added for this purpose. Again, it is pointed out that any elastomer or rubber can be employed in accordance with the present invention as long as such material has the necessary Shore hardness of 70 or greater.

The present invention will now be described with reference to the following specific examples. It is to be understood that such examples are for purposes of illustration only, and the present invention is in no way to be deemed as limited thereto.

Example I 600 denier (metric No. 15) glass yarns each comprising 408 filaments are impregnated with a composition comprising a resorcinol/formaldehyde resin and a synthetic vinyl pyridine/butadiene/styrene rubber latex, so that the said composition penetrates to the interior of the yarn and individually coats the filaments. Moderate drying follows, so that the impregnant may remain flexible.

Three 600 denier yarns thus bonded are assembled and twisted to impart to them a twist of 250 Z turns to the meter.

Finally 3 of these twists are twisted together, imparting to them a twist of 175 S turns to the meter. The twisted yarn thus obtained presents a corrected twisted yarn coefficient of 110.

The said twisted yarn is impregnated for a second time with a composition having a resorcinol/formaldehyde resin base and vinyl pyridine latex.

A radial type tire is then prepared as illustrated in FIG. 1 with dimensions 165 x 380, with a tread, a bead, a wire, and a casing comprising two cords of 1650/2 denier rayon twisted yarn (1000 strands of twisted yarns to meter width). The twisted rayon yarns of the casing have a twist of 472 Z turns and 472 S turns to the meter. The tread is reinforced by a belt comprising two sheets of cabled glass yarn (770 strands of twisted 1800/3 denier yarn, i.e. metric count 1.66, per meter of width), each of the said sheets being at an angle of 18° to the equatorial plane of the tire. The sheets are symmetrically disposed above a layer of natural rubber compounded with black to produce a Shore hardness 78 and a thickness of 2.5 mm. and a width identical to that of the lower sheet of the belt.

Several tires of dimensions 165 x 380, similar to the tire just described, were tested at 50 km./hour on a wheel 1 m. in diameter provided on its periphery with a plunger finger having the form of a cylinder with an hemispherical end.

The cylindrical part of the plunger finger has a diameter of 35 mm.; the longitudinal axis of the plunger finger is inclined at 45° relatively to the tangent to the wheel drawn at the base of the finger. The projecting distance of the end of the finger to the wheel is 61 mm.

The direction of rotation is chosen so that it is the side of the plunger finger which makes an angle of 45° to the tangent to the wheel, which strikes first the rotating tire.

The inflation pressure was maintained constant at 1.8 kg,. and the load exerted on the tire was 400 kg.

After running for one hour (16,000 impacts) the cabled cords were still intact. Slight deterioration appeared only toward 25,000 cycles on the average, due principally to detachment of the edges of the sheets.

After road tests under ordinary driving conditions the cabled cords extracted from the worn tires were still in good condition.

Example II

The same tires as in Example I were built, but the layer of elastomer of Shore hardness 78 was replaced by a layer of natural rubber with Shore hardness 60 and also the 1800/3 denier cabled glass cords, i.e. metric count 1.66 with a twist of 250 Z turns and 175 S turns per meter, corrected twist (coefficient of the twisted yarn, 110) was replaced by 1800/3 denier cabled glass cords with twist of 90 Z turns and 70 S turns per meter (corrected twist coefficient 44).

The wheel test in the conditions of Example I showed on an average that after 8000 cycles there was distinct deterioration of the twisted glass cords.

On the road in ordinary driving conditions the cabled glass cords suffered heavy breakages after 4000 km.

These cabled cords gave much less than normal mileage.

Example III

Tires identical with those of Example I were made, placing a layer of rubber 2.5 mm. thick, of Shore hardness 78, above the casing cords but using a reinforcing belt comprising 1800/3 denier twisted glass yarns, i.e. metric count 1.66 with a twist of 90 Z turns and 70 S turns per meter (corrected twist coefficient 44).

On a test wheel with plunger finger, the cabled glass cords began to wear on an average at about 14,000 cycles.

On the road in ordinary driving conditions the cabled glass cords suffered heavy breakages after 8000/9000 km.

The above three examples clearly illustrate the critical nature of employing in combination a belt comprising one or more sheets of cabled cords of twisted glass yarns having a high corrected twist coefficient above 80 in conjunction with a layer of hard elastomer rubber, i.e. a layer of hard elastomer having a Shore hardness of 70 or greater. Thus, the present invention comprises a great improvement in the production of radial tires by providing a method of reinforcing the tread area of the tires by the use of one or more sheets of cabled cords of glass fibers forming a belt beneath the tread reinforced with one or more layers of hard elastomer or rubber below or below and between the cords of glass filaments. The reinforcement of the tread area of a radial tire with glass filaments presents great advantages not heretofore possible because of the fragile nature of the filaments. Thus, the twisted glass yarns are more convenient to employ than steel twists, since they can be manufactured more easily since in manufacture they are related to the production of twisted textiles and yarns. Moreover, like steel, the twisted glass filaments have a high modulus, thereby allowing the production of tires having a length of wear that is higher than is possible to obtain by the employment of twisted yarns of artificial or synthetic materials. Accordingly, the present invention allows for the production of radial tires having a reinforced tread area which combines the advantageous properties of synthetic textiles and twisted steels.

While the present invention has been described primarily with respect to the foregoing specific examples, it is to be understood that the present invention is in no way to be deemed as limited thereto, but should be construed as broadly as all or any equivalents thereof.

I claim:

1. In a tire having casing cords and a continuous peripheral tread, the improvement which comprises providing between the tread and the casing cords a reinforced tread area including:
   (a) A belt comprising one or more sheets of cords of twisted yarns of continuous glass filaments having a corrected twist coefficient above 80; and
   (b) A layer of elastomer of Shore hardness of at least 70 and having a thickness of from 1–6 mm. located between said belt and said casing cords.
2. The tire of claim 1 wherein said continuous glass filaments are individually sheathed in an elastomer.
3. The tire of claim 1 including an additional layer of elastomer of Shore hardness of at least 70 located between two said sheets of cords of twisted yarns of continuous glass filaments.
4. The tire of claim 3 wherein the first and second layers of elastomer have a total thickness not exceeding 6 mm.
5. The tire of claim 3 wherein said continuous glass filaments are individually sheathed in an elastomer.

References Cited

UNITED STATES PATENTS

| | | | |
|---|---|---|---|
| 2,541,506 | 2/1951 | Cuthbertson et al. | 152—360 |
| 3,081,811 | 3/1963 | Beckadolph | 152—361 |
| 3,390,714 | 7/1968 | Marzocchi | 152—361 |

ARTHUR L. LA POINT, Primary Examiner

C. B. LYON, Assistant Examiner

U.S. Cl. X.R.

152—360